United States Patent [19]

Obara

[11] Patent Number: 5,779,367
[45] Date of Patent: Jul. 14, 1998

[54] SPLINE BEARING WITH DETECTION DEVICE

[75] Inventor: Kouji Obara, Kanagawa, Japan

[73] Assignee: Nippon Thompson Co., Ltd., Tokyo, Japan

[21] Appl. No.: 891,346

[22] Filed: Jul. 10, 1997

[30] Foreign Application Priority Data

Aug. 15, 1996 [JP] Japan .................... 8-233591

[51] Int. Cl.$^6$ .................. F16C 29/06; G01B 7/00
[52] U.S. Cl. .................. 384/8; 324/207.24; 384/43
[58] Field of Search .................. 384/8, 43, 44, 384/45, 448, 49; 324/207.24

[56] References Cited

U.S. PATENT DOCUMENTS

| 4,936,692 | 6/1990 | Tanaka | 384/43 |
| 5,476,324 | 12/1995 | Takei | 384/8 |
| 5,606,256 | 2/1997 | Takei | 324/207.24 X |
| 5,635,833 | 6/1997 | Onodera et al. | 324/207.24 X |

FOREIGN PATENT DOCUMENTS

A685927 12/1994 Japan.

*Primary Examiner*—Thomas R. Hannon
*Attorney, Agent, or Firm*—Sughrue, Mion, Zinn, Macpeak & Seas, PLLC

[57] ABSTRACT

A ball spline bearing having a detection device which detects the relative positions and so forth of a spline shaft and outer cylinder by forming a plurality of narrow grooves 21c in spline shaft 21 and arranging extremely narrow and linear scales 31 and 32 in these grooves.

7 Claims, 11 Drawing Sheets

SPLINE BEARING WITH DETECTION DEVICE

BACKGROUND OF THE INVENTION

1. Field of the Invention

The present invention relates to a spline bearing equipped with a detection device that detects the relative positions of a spline shaft and outer cylinder.

2. Description of the Prior Art

A spline bearing of the prior art is disclosed in Japanese Laid-Open Utility Model Publication No. 6-85927. FIG. 1 shows an angular ball spline.

As shown in FIG. 1, six linear track grooves 1a are formed mutually in parallel in the lengthwise direction in spline shaft 1, and outer cylinder 2 fits onto this spline shaft 1. Six rolling element circulating paths (not shown) are formed corresponding to each track groove 1a in this outer cylinder 2, and a large number of balls (not shown) are arranged and contained within these rolling element circulating paths. The balls circulate by rolling over track grooves 1a accompanying relative movement of spline shaft 1 and outer cylinder 2.

Detected portion 5 is formed between the track grooves 1a in spline shaft 1. Small case 7, which is attached to the end of outer cylinder 2, contains a detecting portion (to be described later) that detects detected portion 5.

The detected portion 5 is magnetized by a magnetic covering provided on the surface of spline shaft 1 or by the surface portion of spline shaft 1 itself.

As shown in FIG. 2, a plurality of N and S magnetic poles are magnetized in the shape of bands at a fine and mutually equal pitch along the track grooves 1a. Reference numeral 9 indicates each magnetizing portion, and reference numeral 10 indicated with hatching is the magnetized portion. Magnetizing portion 12 is a measurement reference that is located on the end.

On the other hand, as shown in FIG. 2, the detecting portion is composed of two electromagnetic conversion devices 14 and 15 for detecting magnetizing portion 9, and magnetic resistance device (MR device) 16, which detects the origin in the form of magnetizing portion 12.

The electromagnetic conversion devices 14 and 15 are arranged offset by a prescribed distance so that the mutual phase in the direction in which each magnetizing portion 9 is arranged differs by $\pi/2$. Thus, the direction of relative movement and movement positions (amount of relative movement) of spline shaft 1 and outer cylinder 2 can be determined by comparing the waveforms of electromagnetic conversion devices 14 and 15 with a control circuit (CPU).

Next, the amount of relative movement of spline shaft 1 and outer cylinder 2 is determined in the manner described below.

Namely, when outer cylinder 2 performs relative movement from the origin position, magnetic resistance device 16 moves away from the origin in the form of magnetizing portion 12 and is no longer detected. Thus, the amount of relative movement is the value obtained by a CPU counting the number of detection signals obtained as a result of the electromagnetic conversion devices 14 and 15 sequentially sensing magnetizing portion 9 from the time operation is started, and then multiplying the pitch of magnetizing portion 9 times the value of that count.

Since detected portion 5 shown in FIGS. 1 and 2 is in the shape of a band and has a broad surface area, considerable space is required to arrange detected portion 5 on spline shaft 1 and the degree of freedom in selecting an installation site is reduced, thereby making it difficult to apply this invention to a small spline bearing.

In addition, since the detecting portion that detects detected portion 5 consists of the two electromagnetic conversion devices 14 and 15 as well as a single magnetic resistance device 16, which respectively sense each magnetizing portion 9 and 12 of detected portion 5, are centrally located in case 7, the space occupied by this detecting portion is relatively large, thereby inhibiting development of a small spline bearing.

In addition, since the interval between electromagnetic conversion devices 14 and 15 of the detecting portion centrally located within case 7 is fixed, even if detection resolution is attempted to be altered by increasing or decreasing the magnetization pitch of magnetizing portions 9, it is difficult to change the prescribed distance of the electromagnetic conversion devices 14 and 15 corresponding to the magnetization pitch, thereby leading to increased costs.

SUMMARY OF THE INVENTION

The object of the present invention is to provide a spline bearing that facilitates reduction of size, is able to flexibly accommodate the particular conditions of use, and is inexpensive.

The spline bearing according to the present invention comprising: a spline shaft in which tracks are formed along the lengthwise direction; an outer cylinder having a rolling element circulating path that includes load bearing tracks corresponding to the tracks, and is able to freely move relative to the spline shaft; and, a plurality of rolling elements that are arranged and contained within the rolling element circulating path and bear the load while rolling over the tracks; wherein, a plurality of grooves are formed in parallel with the tracks in the spline shaft, a linear scale having a detected portion that is magnetized by N and S magnetic poles in a prescribed pattern is arranged in each of the grooves, and a detecting portion composed of magnetic sensors corresponding to each of the scales is provided in the outer cylinder.

In addition, the N and S magnetic poles of the scales are magnetized at the same location for each scale at a fine and mutually equal pitch, and the magnetic scales are composed of a detecting portion in which the magnetic sensors corresponding to the scales are arranged mutually offset by a prescribed distance.

In addition, the N and S magnetic poles of the scales are magnetized offset by a prescribed distance from each of the scales at a fine and mutually equal pitch, and the scales are composed of a detecting portion in which the magnetic sensors corresponding to the scales are mutually arranged at the same location.

In addition, the detected portions of the scales indicate the measuring reference and/or limits of the operating stroke of relative movement of the outer cylinder.

In addition, the scales are arranged at two symmetrical locations on the spline shaft.

In addition, the detecting portions are housed within the outer cylinder.

In addition, the detecting portions are installed in a flange formed on the outer cylinder body of the outer cylinder by means of a mounting block.

DESCRIPTION OF THE PREFERRED EMBODIMENTS

The following provides an explanation of embodiments of the spline bearing according to the present invention with reference to the drawings.

Figure 1:
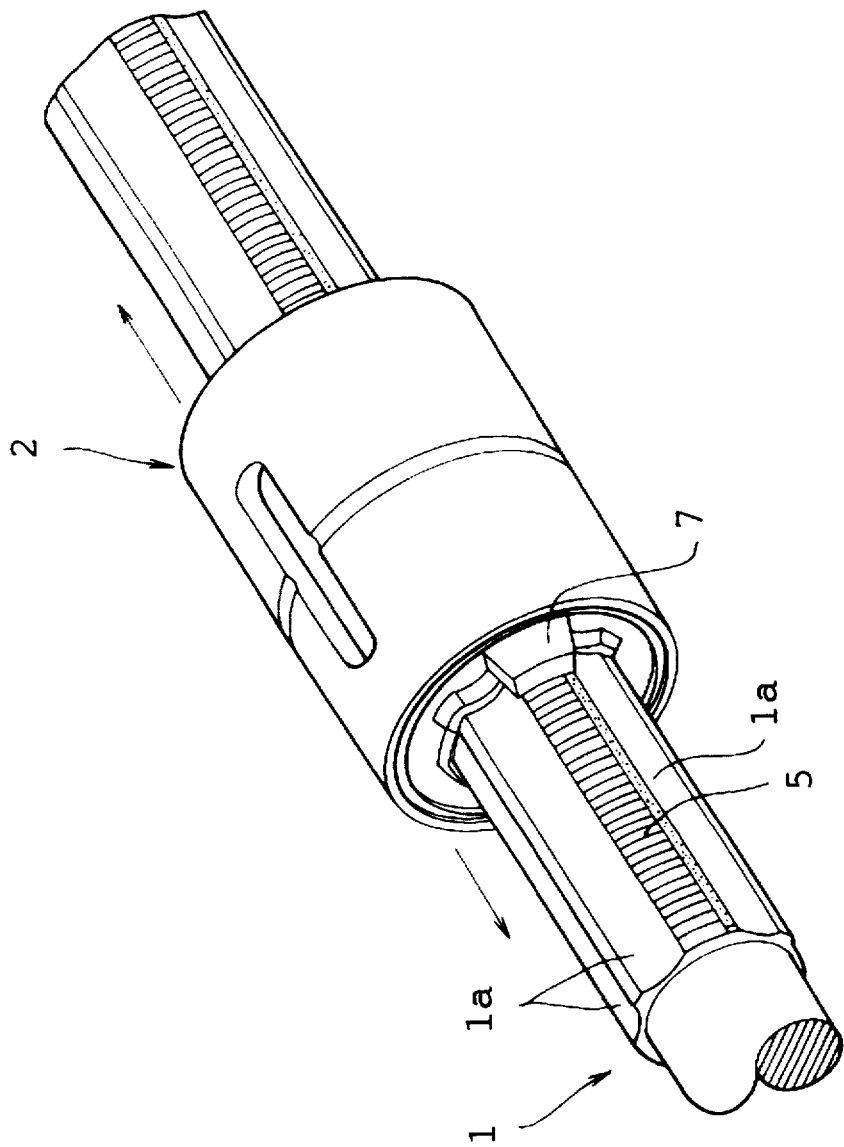
FIG. 1 is a perspective view of the essential portion of the ball spline of the prior art.
Figure 2:
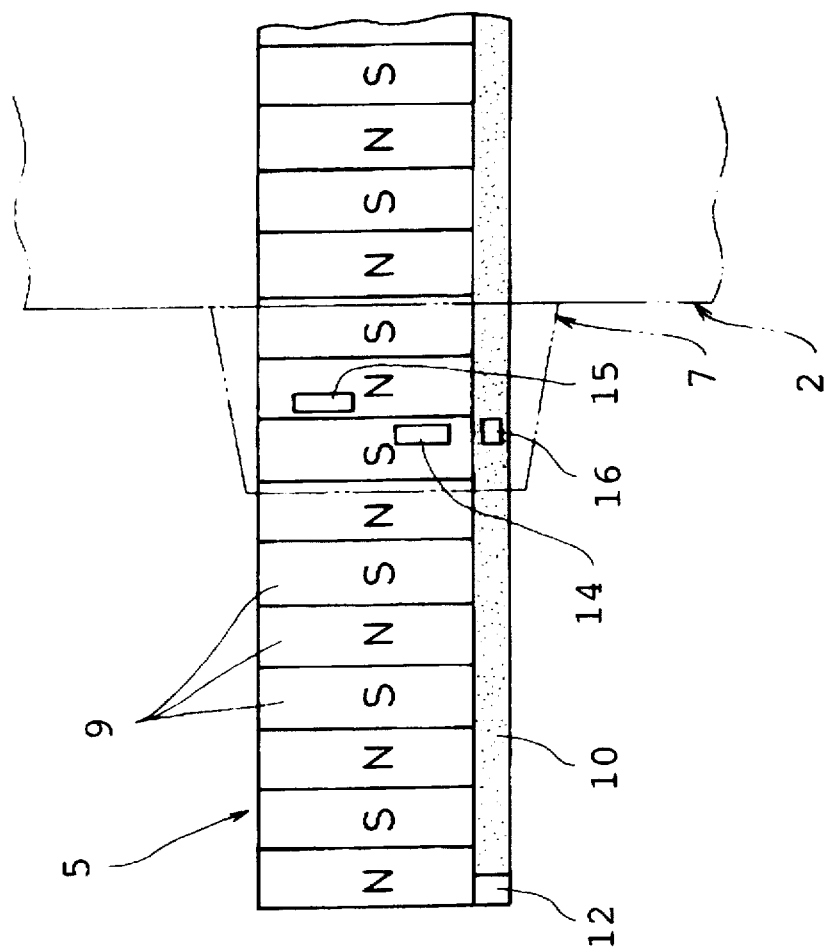
FIG. 2 is an overhead view showing the essential portion of the detection device shown in FIG. 1.
Figure 3:
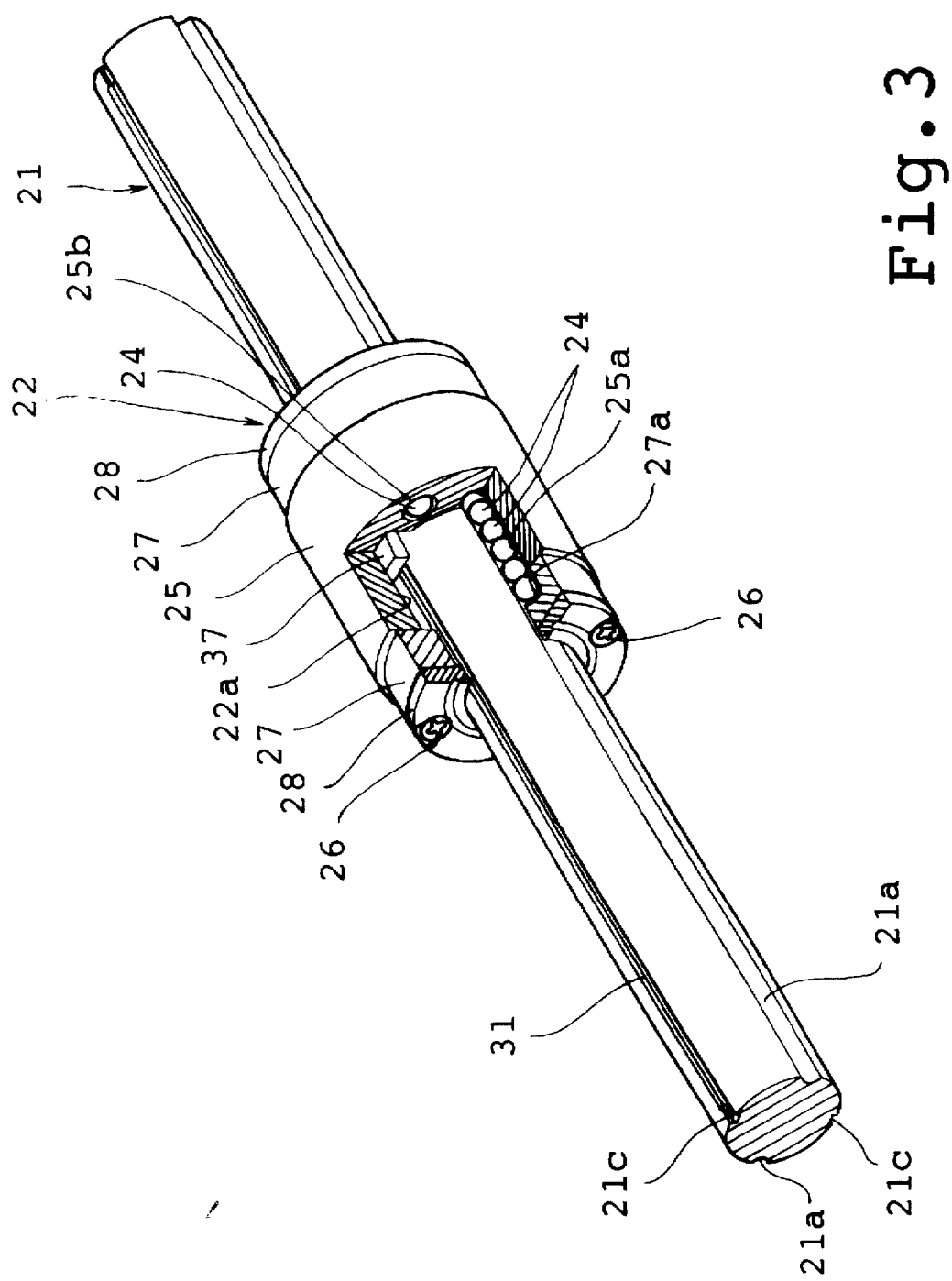
FIG. 3 is a perspective view, including a partial cross-section, of a ball spline as a first embodiment of the present invention.
Figure 4:
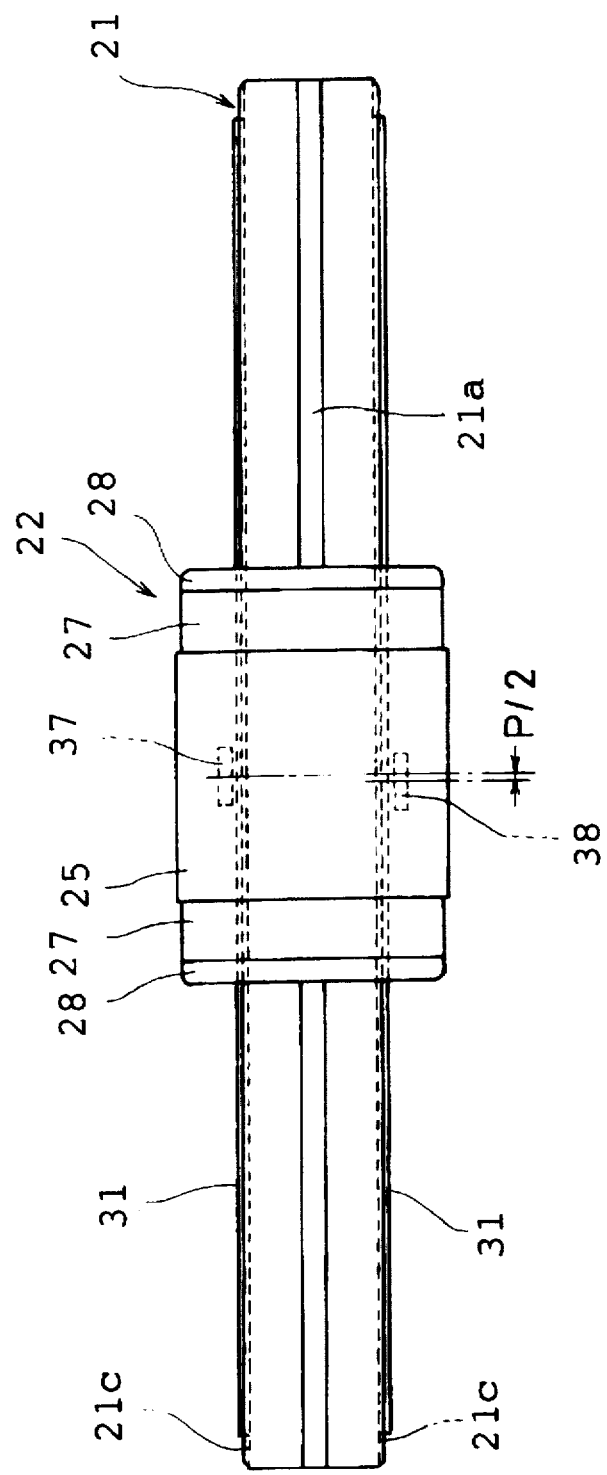
FIG. 4 is a side view of the ball spline shown in FIG. 3.

FIGS. 3 and 4 show a small-diameter (small-sized) two track radial ball spline as a first embodiment of the present invention. The present invention can also be applied to a radial ball spline having more than two tracks or an angular ball spline as well.

This ball spline is composed of cylindrical spline shaft 21 and cylindrical outer cylinder 22, and outer cylinder 22 fits onto spline shaft 21. Two tracks in the form of track grooves 21a are formed in spline shaft 21 at symmetrical locations along its lengthwise direction. Rolling element circulating paths are formed in outer cylinder 22 corresponding to these track grooves 21a. A large number of rolling elements in the form of balls 24 are arranged and contained within these rolling element circulating paths. Balls 24 circulate while bearing the load while rolling over the track grooves 21a accompanying relative movement of spline shaft 21 and outer cylinder 22.

The outer cylinder 22 has outer cylinder body 25, a pair of circular end caps 27 fastened to both ends of this outer cylinder 25 by screws 26, and end seals 28 that seal the gap between spline shaft 21 and outer cylinder 22 and are fastened to the outsides of both end caps 27 by screws 26.

The rolling element circulating paths are composed of load bearing track grooves 25a and return path 25b that are formed linearly and mutually in parallel in the outer cylinder body 25, and semi-circular direction changing paths 27a that are formed in end caps 27 and connect the corresponding ends of load bearing track grooves 25a and return path 25b.

In addition, grooves 21c in parallel with the track grooves 21a are formed at two symmetrical locations in the spline shaft 21. Linear scales 31 are attached to grooves 21c by press fitting or adhesive and so forth.

Figure 5:
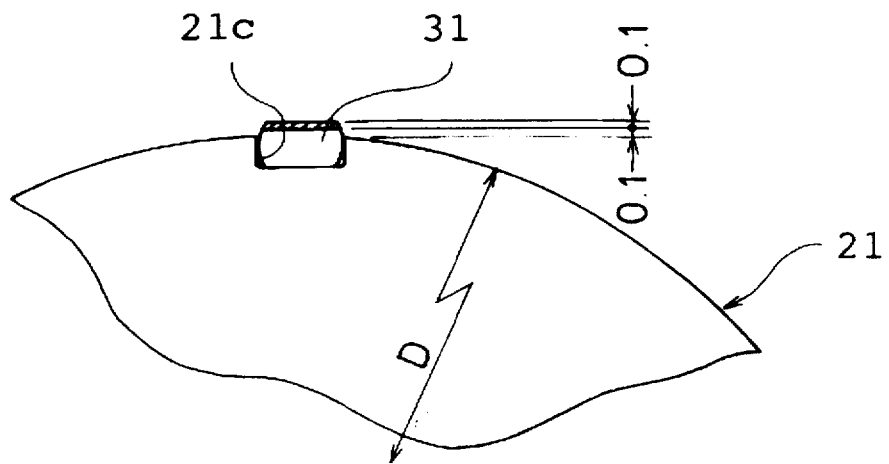
FIG. 5 is an enlarged view of a portion of the ball spline shown in FIGS. 3 and 4.
Figure 6:
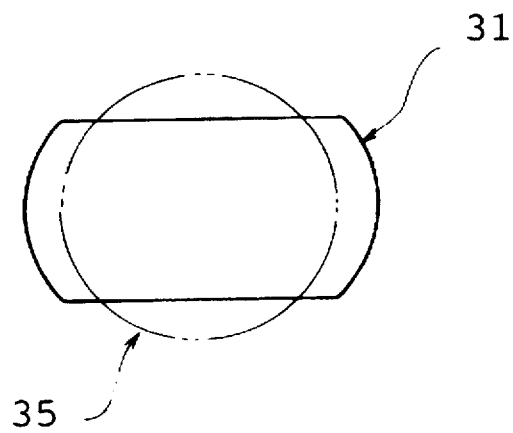
FIG. 6 is a front view of a scale of the ball spline shown in FIGS. 3 and 4.

Scales 31 are composed of a ferromagnetic material (such as Fe—Cr—Co). As shown in FIG. 6, scales 31 are comprised of wire 35 having a circular cross-section compressed into the shape of a flat wire. As shown in FIG. 5, the grooves 21c are provided with slots in which the scales 31 are embedded. Scales 31 are made to protrude from the slots of grooves 21c by, for example, 0.2 mm, after which these protruding portions are removed by grinding away only 0.1 mm (portion indicated with the hatching) so that scales 31 are parallel with the track grooves 21a.

Furthermore, the dimensions indicated by symbol D in FIG. 5, namely the diameter of spline shaft 21, can be arbitrarily selected to be, for example, about 5 mm.

As shown in FIGS. 3 and 4, detecting portions 37 and 38 are provided in outer cylinder 22 corresponding to each of the above-mentioned scales 31. These detecting portions 37 and 38 are contained in grooves 22a formed in the axial direction on the inside of outer cylinder 22, and are arranged to be separated by a prescribed slight gap from each scale 31.

Figure 7:
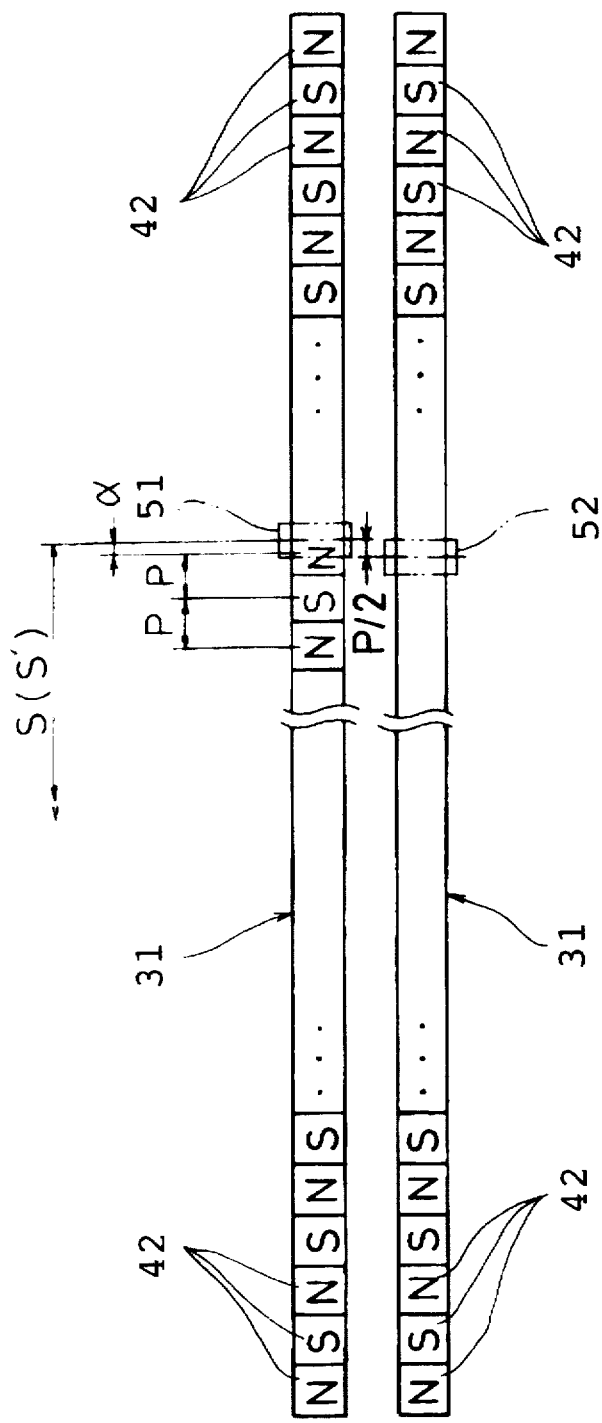
FIG. 7 is an overhead view showing the detection device of the ball spline shown in FIGS. 3 and 4.

FIG. 7 indicates the detected portions arranged on each of the scales 31. These detected portions are comprised by magnetizing a prescribed pattern on a magnetic substance in the form of each scale itself.

As shown in FIG. 7, each scale 31 is magnetized by a large number of N and S magnetic poles at identical locations at a fine and mutually equal pitch along its lengthwise direction as indicated with reference numeral 42. Magnetic poles 42 are for detecting position and determining the direction of relative movement.

On the other hand, detecting portions 37 and 38, which detect the detected portions arranged in outer cylinder 22, are equipped magnetic sensors 51 and 52 shown in FIG. 7, and more specifically, electromagnetic conversion devices composed of Hall effect elements and so forth.

Figure 8:
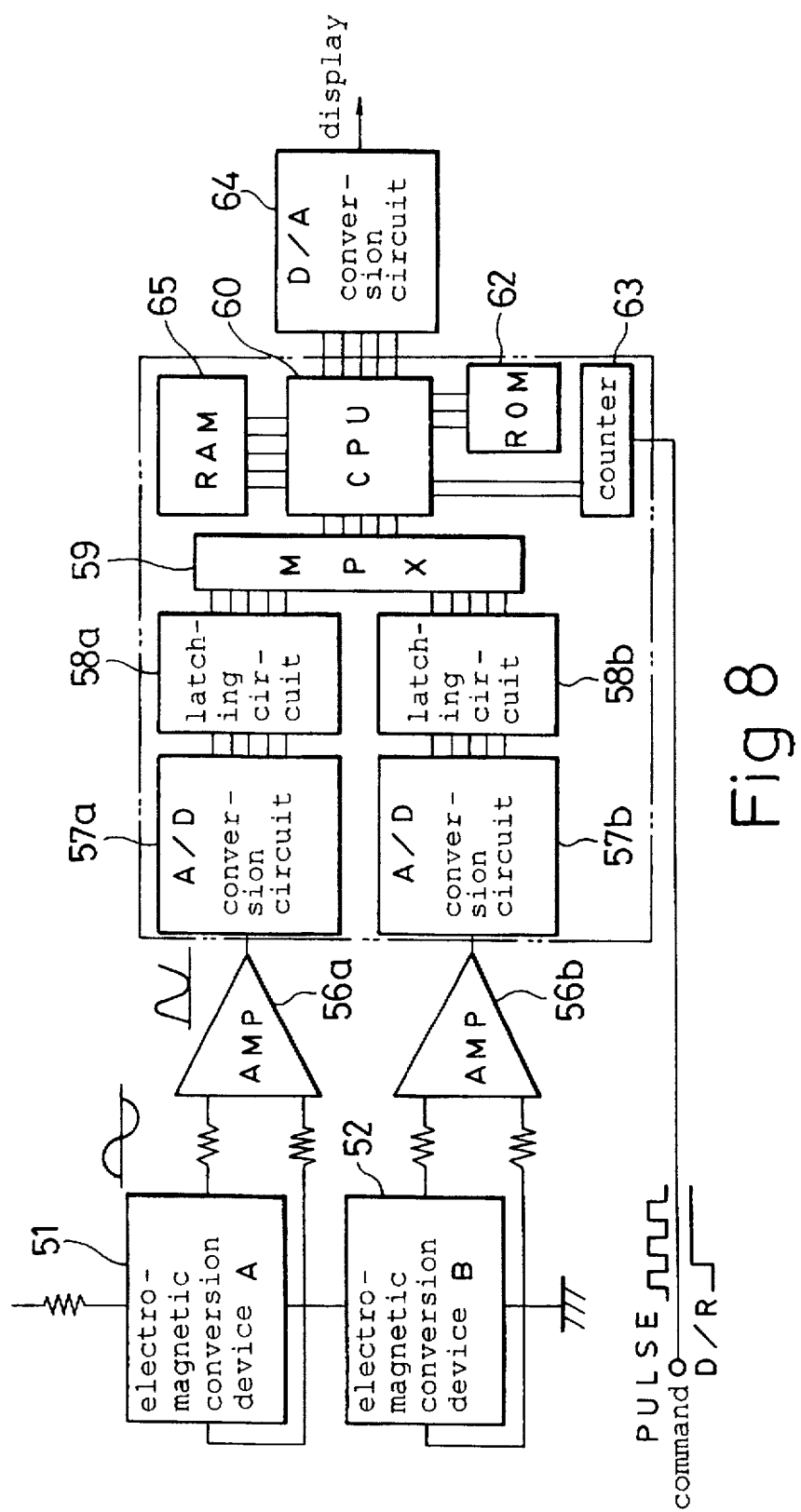
FIG. 8 is a block diagram showing the control system relating to the ball spline shown in FIGS. 3 and 4.

As shown in FIG. 7, electromagnetic conversion devices 51 and 52 are arranged mutually offset by a prescribed distance of ½ of pitch P between magnetic poles in the direction of arrangement of magnetic poles 42. As a result, the signal waveforms from both electromagnetic conversion devices 51 and 52 are mutually shifted out of phase by π/2. Continuous positive and negative sine waves based on a 0 level are obtained for the waveforms obtained from these electromagnetic conversion devices 51 and 52. These waveforms are then amplified from the 0 level to the Vmax level by passing through amplification circuits 56a and 56b as shown in FIG. 8. This is done to facilitate signal processing in a latter stage.

Next, the following provides an explanation of the constitution of a control system used to determine relative positions of spline shaft 21 and outer cylinder 22 based on the detection signal emitted by a detection device composed of the detected portions and detecting portions.

As shown in FIG. 8, the output waveforms from electromagnetic conversion devices 51 and 52 are input to amplification circuits 56a and 56b. The output of these amplification circuits 56a and 56b are input to A/D conversion circuits 57a and 57b, latching circuits 58a and 58b, multiplexer (MPX) 59 and finally CPU (control circuit) 60. Memory (ROM) 62, a counting device in the form of up-down counter 63 and D/A conversion circuit 64 are connected to CPU 60.

The A/D conversion circuits 57a and 57b convert the analog waveforms amplified by amplification circuits 56a and 56b of the previous stage to binary data, after which the respective data is input to latching circuits 58a and 58b. These latching circuits 58a and 58b latch and hold the data of the A/D conversion circuits 57a and 57b of the previous stage in order to synchronously process the data respectively converted by the A/D conversion circuits 57a and 57b.

This held data is then input to multiplexer 59. Since this multiplexer 59 is unable to simultaneously output the data latched with latching circuits 58a and 58b in the case of output to CPU 60 of the next stage, time sharing processing is performed so that data is separately output to CPU 60 where arithmetic processing is performed.

Next, an explanation is provided regarding the arithmetic processing of CPU 60.

First, as the initial operation, when outer cylinder 22 is driven and moves to the reference position (or conversely, when outer cylinder 22 remains stationary and spline shaft 21 moves), a reference position signal is emitted by a reference position detection device not shown. Scale position data stored in memory (RAM) 65 (see FIG. 8) is then reset in response to this reference position signal. Outer cylinder 22 then begins to move towards the desired position according to this reset command. Amplified continuous waveforms having mutually different phases are obtained from electromagnetic conversion devices 51 and 52 corresponding to this movement.

Since the output waveforms of electromagnetic conversion devices 51 and 52 are of different phases, CPU 60 is able to determine the direction of movement of outer cylinder 22 by comparing this differing waveform data.

Next, the amount of movement of outer cylinder 22 is determined in the manner described below.

Namely, if the amount of movement of electromagnetic conversion devices 51 and 52 relative to each scale 31 is taken to be S in FIG. 7, then this becomes the amount of movement of outer cylinder 22.

With respect to the arithmetic of this amount of movement, the voltage ratio of VA/VB is determined by taking the output of electromagnetic conversion device 51 to be VA, and the output of electromagnetic conversion device 52 to be VB.

Since fine position data within a period (P×2) corresponding to VA/VB is stored in advance in memory 62, CPU 60 reads the value that coincides with the value of VA/VB determined by the arithmetic processing as described above from memory 62 and compares that value to determine distance α. Since position data that was previously determined is already stored in memory 65 (although not stored in memory 65 when initially written from the reference position), CPU 60 reads the data, adds the new distance α, and then writes the resulting distance S into memory 65 in the form of new position data. This position data is then displayed with a display circuit not shown (indicated with the word "display" in FIG. 8) enabling determination of relative position.

Since this ball spline employs narrow linear scales 31, scales 31 having a small installation space and allow a large degree of freedom in selecting the installation site, thereby enabling the overall size of the ball spline to be reduced. Since scales 31 are of a linear shape in particular, they can be easily installed on round spline shaft 21.

Since linear scales 31 are arranged in grooves 21c of spline shaft 21, if grooves 21c are formed with high precision, the curvature of scales 31 can be inhibited to ensure accuracy in use as scales.

In this ball spline, since a plurality, in this case 2, scales are provided at different locations, and detecting portions 37 and 38 are provided separately corresponding to each of said scales, detecting portions 37 and 38 may be small components composed only of electromagnetic conversion devices. Since they also can be arranged in a dispersed manner, it becomes easy to reduce the size of the ball spline.

In addition, in the case of changing the detection resolution, since all that is required is to adjust the prescribed distance between electromagnetic conversion devices 51 and 52 of the detecting portions corresponding to scales 31 to match the resolution of the detected portions of the new scales, this ball spline is able to flexibly accommodate the particular conditions of use. Moreover, since there is no need to replace the electromagnetic conversion devices 51 and 52 themselves with new ones each time resolution is changed, costs can be reduced.

In addition, since each scale 31 is arranged at symmetrical locations on spline shaft 21, the amount of space that is occupied can be reduced, thereby making it easier to reduce the size of the ball spline.

Next, the following provides an explanation of a second embodiment of a ball spline according to the present invention. Since this second embodiment has a constitution that is similar to that of the first embodiment with the exception of the portions explained below, those portions that are the same will be omitted, and the explanation will only cover the essential portion.

In the following explanation, the same reference numerals are used for those constituents of the second embodiment that are identical or correspond to those of the first embodiment. This will also apply similarly to all following embodiments to be described later.

Figure 9:
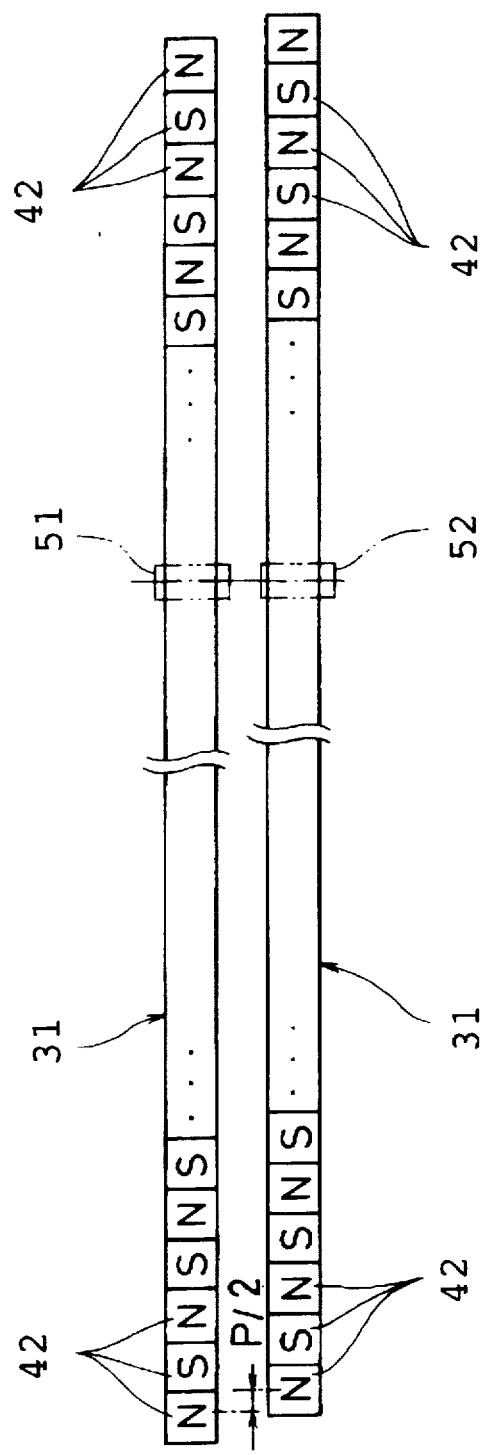
FIG. 9 is an overhead view of the detection device of a ball spline as a second embodiment of the present invention.

As shown in FIG. 9, in the ball spline of the second embodiment, although scales 31 identical to those of the first embodiment are respectively installed in two grooves 21c (see FIGS. 3 and 4) formed in spline shaft 21, this second embodiment differs from the first embodiment in that magnetic poles 42 of each scale 31 are magnetized mutually offset by a prescribed distance of ½ magnetic pitch P.

Thus, electromagnetic conversion elements 51 and 52 corresponding to each scale 31 are arranged at identical locations on outer cylinder 22 in the lengthwise direction of scales 31.

The constitution of the ball spline of this second embodiment is also able to detect the distance of relative movement and direction of movement of spline shaft 21 and outer cylinder 22.

Figure 10:
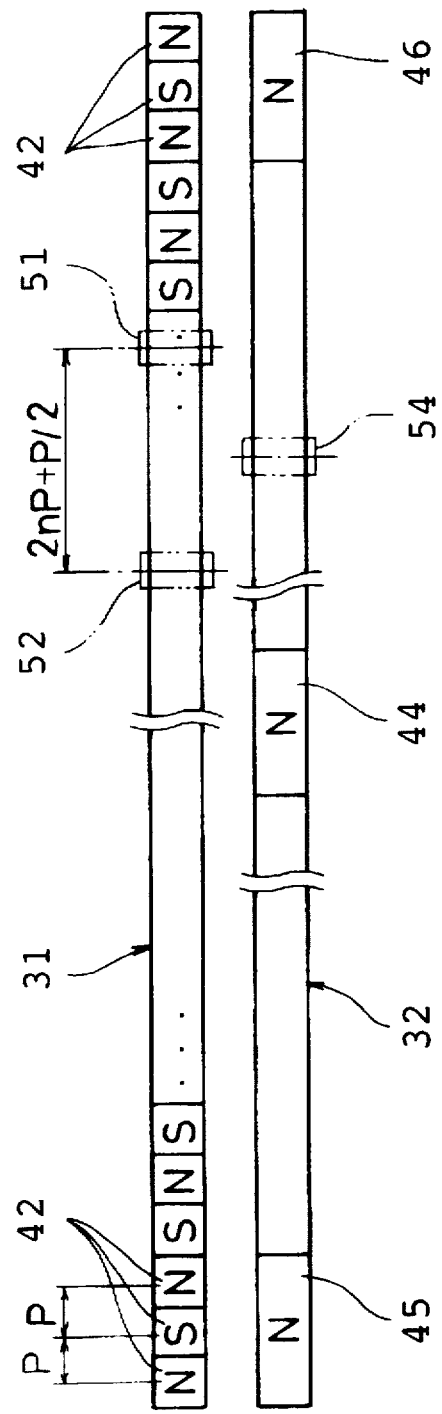
FIG. 10 is an overhead view of the detection device of a ball spline as a third embodiment of the present invention.

Next, an explanation is provided of a third embodiment of the ball spline according to the present invention with reference to FIG. 10.

The following provides an explanation of the difference between the ball spline according to this third embodiment and the first embodiment.

In contrast to the ball spline of the first embodiment having two mutually identical scales 31, the ball spline of the third embodiment has one scale 31, and scale 32 having another magnetization pattern.

As shown in FIG. 10, two electromagnetic conversion devices 51 and 52 are provided on one scale 31, and the prescribed distance between electromagnetic conversion devices 51 and 52 is set to 2nP+P/2 when the pitch of magnetic poles 42 of scale 31 is taken to be P. In other words, the prescribed distance between electromagnetic conversion devices 51 and 52 is not limited to P/2 as in the first embodiment, but can be changed as desired by suitably setting the value of n (number of periods) in the third embodiment as necessary.

In addition, in the other scale 32, for example, a single magnetic pole 44 (N or S pole) in the center of its lengthwise direction in the form of detected portions, or two magnetic poles 45 and 46 on both ends are provided. Magnetic pole 44 serves as the measurement reference for relative movement of spline shaft 21 and outer cylinder 22, while the other two magnetic poles 45 and 46 indicate the limits of the operating stroke.

A single magnetic sensor, and more specifically magnetic resistance (MR) device 54, is provided corresponding to this scale 32. This magnetic resistance device 54 senses magnetic pole 44 as the origin and emits a reference position signal.

In this third embodiment, the detected portions provided on the one scale 32 are used as the measurement reference and operating stroke limit of the relative movement of spline shaft 21 and outer cylinder 22. Thus, the scales themselves are not only an extremely narrow and linear shape, but it is also possible to achieve a further reduction in size of the ball spline.

Furthermore, at least either of magnetic pole 44 for the measurement reference or magnetic poles 45 and 46 for limitation of the operating stroke may be provided as necessary.

Figure 11:
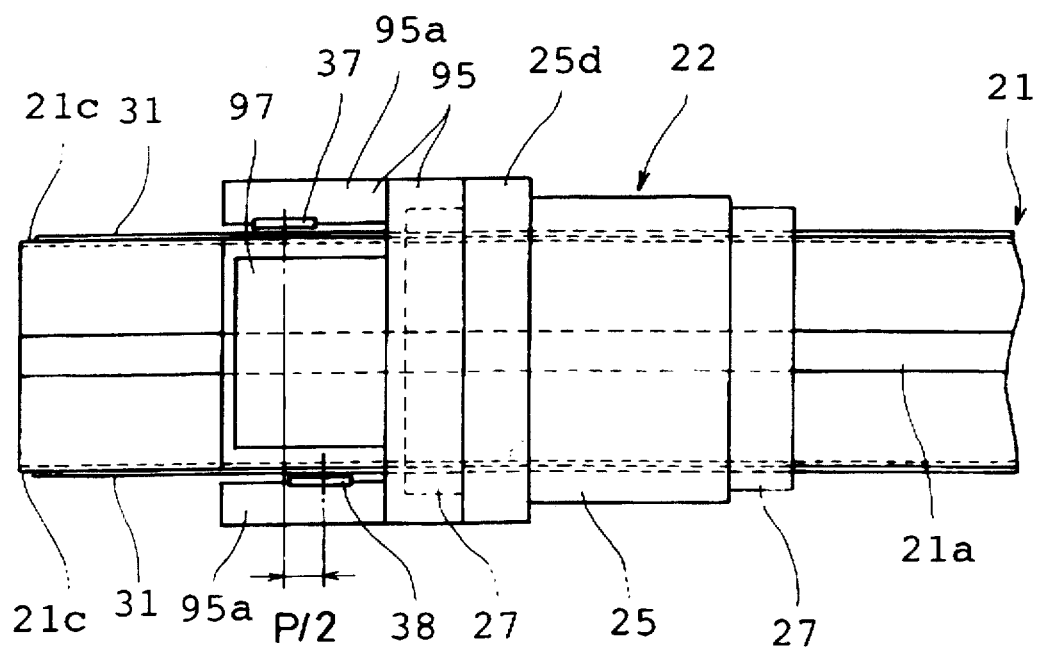
FIG. 11 is a side view of the essential portion of a ball spline as a fourth embodiment of the present invention.
Figure 12:
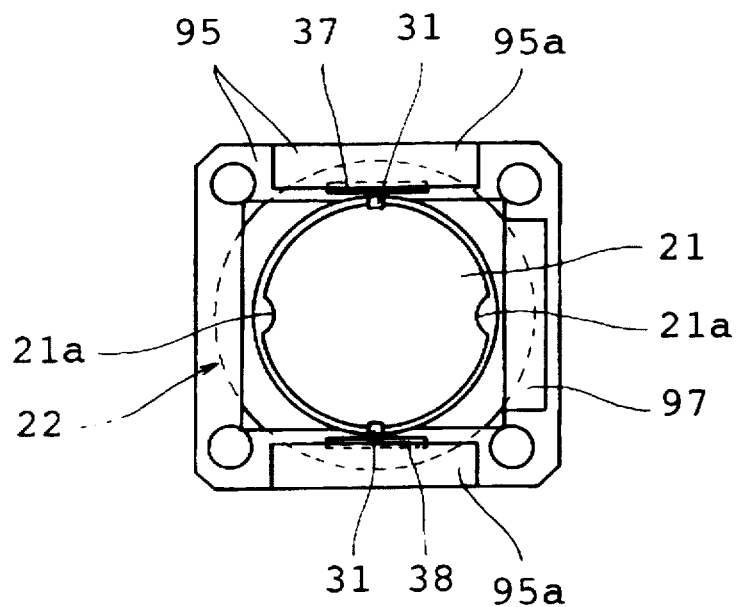
FIG. 12 is a front view of the ball spline shown in FIG. 11.

FIGS. 11 and 12 indicate a fourth embodiment of a ball spline according to the present invention.

This ball spline has a constitution nearly identical to that of the first embodiment previously described (see FIG. 3 and other drawings) with the exception of the detecting portions having an encoder being encased around the outside of outer cylinder 22.

Flange 25d is formed on outer cylinder body 25 of outer cylinder 22 of this ball spline, and detecting portions 37 and 38 are installed on flange 25d by means of mounting block 95. Mounting block 95 is fastened to flange 25d with screws and so forth, and both detecting portions 37 and 38 are fixed with adhesive and so forth to overhangs 95a formed in mounting block 95.

Furthermore, reference numeral 97 indicates an amplification circuit that performs amplification and so forth of signals emitted from both detecting portions 37 and 38, and this amplification circuit 97 is attached to mounting block 95.

This encasement type needs only to be encased around a ball spline equipped with a flange, and outer cylinder 22 does not require any processing whatsoever.

In contrast, in the first embodiment previously described, although outer cylinder 22 requires a slight amount of processing, such as grooves 22a shown in FIG. 3, the detecting portions (indicated with reference numerals 37 and 38) are encased within outer cylinder 22 resulting in a compact size overall, thereby achieving a reduced size.

Figure 13:
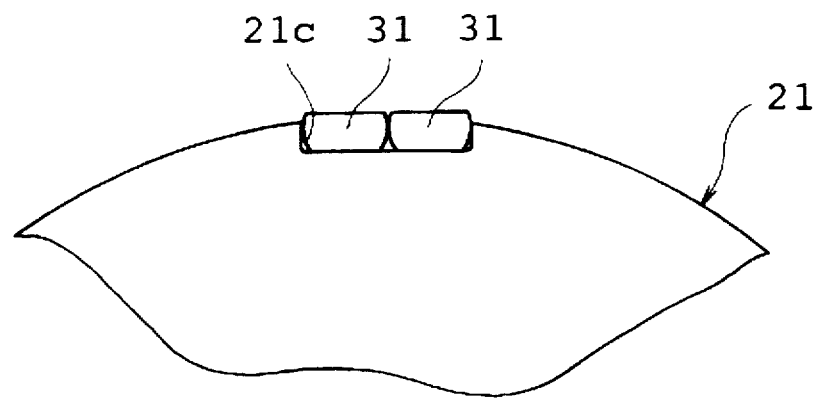
FIG. 13 is a front view showing a variation of the scale according to the present invention.

Furthermore, although one detected portion each in the form of a scale is provided in the grooves of the spline shaft corresponding to each electromagnetic conversion device 51 and 52 and magnetic resistance device 54 (see FIG. 10), as shown in FIG. 13, increased amplification gain can be achieved by arranging two or more of the same type of scales in parallel.

In the case of providing a plurality of scales in the above manner, for example, one of the scales may be used as a dummy scale without magnetizing, and then either replaced with the required magnetized scale as the need arises, or newly performing the required magnetization on said dummy scale itself.

Figure 14:
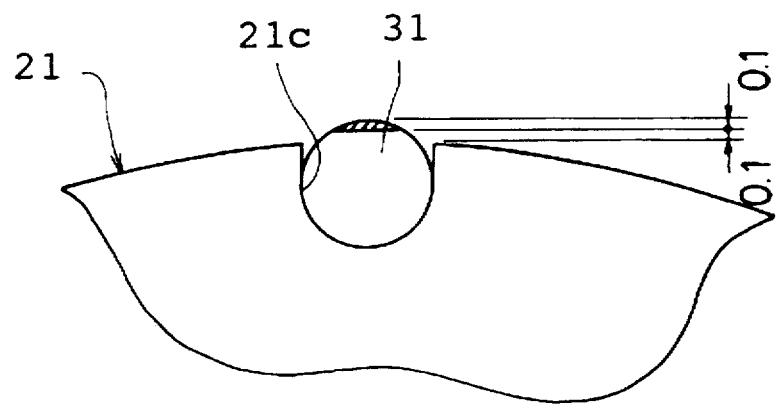
FIG. 14 is a front view showing another variation of the scale according to the present invention.

In addition, although the scales used in each embodiment have a flat cross-section, as shown in FIG. 14, a linear member having a circular cross-section may be used as scale 31. In this case, as shown in the drawing, it is preferable that groove 21c formed in spline shaft 21 be U-shaped. However, the flat scale used in each of the embodiments offers advantages including increasing the lines of magnetic flux that cross the corresponding electromagnetic conversion device.

Moreover, although scale 32 (shown in, for example, FIG. 10) for the measurement reference (origin) and the limits of the operating stroke (limit positions) provided in the third embodiment (see FIG. 10) is formed to have a long shape in the same manner as scale 31 for position detection, since the layout of the measurement reference and the limits of the operating stroke varies according to the use, this scale 32 may be made to be short, and its position may be able to be changed as necessary.

In addition, the present invention is not limited to the constitutions of each of the embodiments described above, but is able to realize a diverse range of constitutions by mutually combining or applying the constitutions included in each of these embodiments.

As has been explained above, since the spline bearing according to the present invention employs narrow, linear scales, it requires little space for installation and offers a larger degree of freedom in selecting the installation site, while also offering the advantage of enabling the overall size of the bearing to be easily reduced. In particular, installation on a spline shaft, which is a round shaft, is easy due to its linear shape.

Since the linear scales are arranged in grooves provided in the spline shaft, the curvature of the scales can be inhibited and ensure accuracy in use as scales if the grooves are formed with high precision.

In the spline bearing according to the present invention, a plurality of scales are provided at different locations, and detecting portions are separately provided corresponding to each of the scales. According to this constitution, in addition to offering greater degree of freedom in selecting the installation locations of the scales, each of the detecting portions may be composed only of, for example, electromagnetic conversion devices and magnetic resistance devices (MR devices), and also since they can be arranged in a dispersed manner, these occupied spaces are small and it becomes easy to reduce the size of the bearing.

In the case of changing the detection resolution, all that is required is to adjust the prescribed distance between each detecting portion corresponding to the scales to match the detected portion of the scales having the new resolution, for the present invention being able to flexibly accommodate the particular conditions of use. Moreover, since there is no need to replace the detecting portions themselves with new ones each time resolution is changed, costs can be reduced.

What is claimed is:

1. A spline bearing comprising: a spline shaft in which tracks are formed along the lengthwise direction; an outer cylinder having a rolling element circulating path that includes load bearing tracks corresponding to the tracks, and is able to freely move relative to the spline shaft; and, a plurality of rolling elements that are arranged and contained within the rolling element circulating path and bear the load while rolling over the tracks; wherein, a plurality of grooves are formed in parallel with the tracks in the spline shaft, a linear scale having a detected portion that is magnetized by N and S magnetic poles in a prescribed pattern is arranged in each of the grooves, and a detecting portion composed of magnetic sensors corresponding to each of the scales is provided in the outer cylinder.

2. A spline bearing as set forth in claim 1 wherein N and S magnetic poles of the scales are magnetized at the same location for each scale at a fine and mutually equal pitch, and the magnetic scales are composed of a detecting portion in which the magnetic sensors corresponding to the scales are arranged mutually offset by a prescribed distance.

3. A spline bearing as set forth in claim 1 wherein N and S magnetic poles of the scales are magnetized offset by a prescribed distance from each of the scales at a fine and mutually equal pitch, and the scales are composed of a detecting portion in which the magnetic sensors corresponding to the scales are mutually arranged at the same location.

4. A spline bearing as set forth in claim 1 wherein the detected portions of the scales indicate the measuring reference and/or limits of the operating stroke of relative movement of the outer cylinder.

5. A spline bearing as set forth in claim 1 wherein the scales are arranged at two symmetrical locations on the spline shaft.

6. A spline bearing as set forth in claim 1 wherein the detecting portions are housed within the outer cylinder.

7. A spline bearing as set forth in claim 1 wherein the detecting portions are installed in a flange formed on the outer cylinder body of the outer cylinder by means of a mounting block.

* * * * *